(12) United States Patent
Dransmann et al.

(10) Patent No.: US 12,716,478 B2
(45) Date of Patent: Aug. 25, 2026

(54) GEARWHEEL WITH AN INSERT PORTION MADE OF METAL AND AN OUTER PORTION MADE OF PLASTIC, STEERING MECHANISM WITH SUCH A GEARWHEEL AND METHOD FOR PRODUCING SUCH A GEARWHEEL

(71) Applicant: ZF Friedrichshafen AG, Friedrichshafen (DE)

(72) Inventors: Markus Dransmann, Dinklage (DE); Thorsten Kamphaus, Lohne (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/904,491

(22) Filed: Oct. 2, 2024

(65) Prior Publication Data

US 2025/0116322 A1 Apr. 10, 2025

(30) Foreign Application Priority Data

Oct. 4, 2023 (DE) ..................... 10 2023 209 703.6

(51) Int. Cl.
*F16H 55/22* (2006.01)
*B29C 45/27* (2006.01)
*B29L 15/00* (2006.01)
*F16H 55/06* (2006.01)

(52) U.S. Cl.
CPC ............. *F16H 55/22* (2013.01); *F16H 55/06* (2013.01); *B29C 45/2725* (2013.01); *B29L 2015/003* (2013.01); *F16H 2055/065* (2013.01)

(58) Field of Classification Search
CPC .... F16H 55/22; F16H 55/06; F16H 2055/065; B29C 45/2725; B29L 2015/003
See application file for complete search history.

(56) References Cited

U.S. PATENT DOCUMENTS 11,662,009 B2 * 5/2023 Rieple ..................... F16H 55/06 74/446
11,718,000 B2 8/2023 Pauloz et al.
2021/0062905 A1 * 3/2021 Nakayama ........ B29C 45/14598

FOREIGN PATENT DOCUMENTS

EP 2427145 B1 12/2017

OTHER PUBLICATIONS

DE_102020122229 (Year: 2021).*
EP_3974680_A1_M (Year: 2020).*
German Patent Office, Office Action issued in German patent application No. 10 2023 209 703.6 (May 14, 2022).

* cited by examiner

*Primary Examiner* — Terence Boes
(74) *Attorney, Agent, or Firm* — Secant IP, PLLC

(57) ABSTRACT

A gearwheel has an insert portion made of metal and an outer portion made of plastic, where the outer portion has a toothed rim and the outer portion is injection-molded onto the insert portion. The outer portion has a plurality of injection-molded sections formed on a side surface of the insert portion which surface is directed transversely or perpendicularly to the central longitudinal axis. To produce the gearwheel inexpensively and with sufficiently good physical properties as regards its load-bearing capacity and its useful life. The gearwheel is characterized in having injection-molded sections spaced apart from one another on the side surface of the insert portion and side surface areas of the insert portion are left free between directly adjacent injection-molded sections.

19 Claims, 9 Drawing Sheets

GEARWHEEL WITH AN INSERT PORTION MADE OF METAL AND AN OUTER PORTION MADE OF PLASTIC, STEERING MECHANISM WITH SUCH A GEARWHEEL AND METHOD FOR PRODUCING SUCH A GEARWHEEL

RELATED APPLICATIONS

This application claims the benefit of and right of priority under 35 U.S.C. § 119 to German Patent Application no. 10 2023 209 703.6, filed on 4 Oct. 2023, the contents of which are incorporated herein by reference in its entirety.

FIELD OF THE DISCLOSURE

The invention relates to a gearwheel with an insert portion made of metal and an outer portion made of plastic, wherein the outer portion comprises a toothed rim with a plurality of teeth directed radially relative to a central longitudinal axis, and the outer portion is injection-molded onto the insert portion, and the outer portion comprises a plurality of injection-molded sections which are formed on a side surface of the insert portion orientated transversely or perpendicularly to the central longitudinal axis. In addition, the invention relates to a steering mechanism for a motor vehicle with such a gearwheel and to a method for producing such a gearwheel.

BACKGROUND

Such a gearwheel is known from EP 2 427 145 A1. In that case the plurality of injection-molded sections merge into one another and form a continuous ring on the side surface of the insert portion.

SUMMARY

The purpose of the present invention is to develop further a gearwheel of a steering mechanism and/or a method of the type mentioned at the start, in such manner that the gearwheel can be produced inexpensively and with sufficiently good physical properties as regards its load-bearing capacity and its useful life. Preferably, flow paths of the plastic for producing the outer portion should be able to be reduced. In particular, an alternative embodiment should be provided.

The objective of the invention is achieved with a gearwheel, a steering mechanism according, and/or a method according as disclosed herein. Preferred further developments of the invention emerge from the description that follows.

The gearwheel comprises an insert portion made of metal and an outer portion made of plastic. The metal can be steel or aluminum. The plastic can be unreinforced or reinforced, in particular fiber-reinforced plastic. Preferably, the gearwheel is made in two parts. In this case the insert portion is a first part or first component and the outer portion is a second part or second component of the gearwheel. Preferably, the gearwheel is designed for use in a steering mechanism of a vehicle. The outer portion forms a toothed rim with a plurality of teeth directed radially outward relative to a central longitudinal axis of the gearwheel. In particular the gearwheel is in the form of a spur gear or a helical gear. The teeth of the outer portion can be straight teeth or helical teeth.

The outer portion is injection-molded onto the insert portion. In this case the outer portion comprises a plurality of injection-molded sections. In particular, the outer portion with its toothed rim and injection-molded sections is made as one piece. Thus, as a single component, namely the outer portion, the injection-molded sections, and the toothed rim, can merge into one another, preferably in a material-integrated manner. The injection-molded sections are formed on a side surface of the insert portion, that surface being directed transversely or perpendicularly to the central longitudinal axis of the gearwheel. In particular, all the injection-molded sections are formed and/or arranged on the same side of the insert portion. Preferably, by virtue of the injection-molded sections an interlock, in particular one-sided or double-sided and effective in the axial direction of the central longitudinal axis, is formed between the outer portion and the insert portion.

According to the invention, sections of the plurality of injection-molded sections are spaced apart from one another on the side surface of the insert portion, so that areas of the side surface of the insert portion are left free between directly adjacent injection-molded sections.

Here, it is advantageous that flow paths of the plastic for forming the outer portion are reduced. In that way, after-pressure feeding during the injection-molding of the outer portion can be improved. Furthermore, a smaller quantity of plastic material can be used for forming the outer portion. In particular, an alternative embodiment is provided.

In particular, the injection-molded sections on the side surface of the insert portion do not merge with one another. Consequently, no joint seams are formed on the side surface between injection-molded sections. Alternatively, a web-like or strip-like connecting section of the plastic can be positioned between injection-molded sections directly adjacent to one another to form the outer portion. In that way, the directly adjacent injection-molded sections on the side surface can partially merge into one another by virtue of the connecting sections. At the same time however, in this embodiment as well, an area of the side surface between the directly adjacent injection-molded sections remains free. In particular, the web-like or strip-like connecting sections merge into the toothed rim of the outer portion. Preferably, the web-like or strip-like connecting sections are made curved or in the form of ring sections.

Preferably, a side or side surface of the insert portion facing away from the injection-molded sections is not covered, and in particular neither completely nor partially covered, by the plastic of the outer portion. Thus, the plastic can be arranged exclusively just on one side surface to form the injection-molded sections and around the outer circumference of the insert portion to form the toothed rim.

Alternatively, the plastic of the outer portion can surround the outer circumference of the insert portion, so that both the side surface and a side surface facing away from the side surface, or a further side surface of the insert portion, is covered by the plastic of the outer portion. In that way, in this embodiment the interlock between the outer portion and the insert portion is improved.

The insert portion can be in the form of a hub or axle. Furthermore, the insert portion can have a cylindrical, or out-of-round, for example polygonal outer circumference. The inner circumference of the outer portion in contact with the outer circumference of the insert portion is shaped to correspond with the outer circumference of the insert portion. In particular the insert portion is in the form of a cylindrical hub or a disk-shaped hub or a hub with an inner cylinder, an outer cylinder and a ring disk, wherein the ring disk is connected to the outer cylinder. In that way the ring disk can connect an axial end, relative to the central longitudinal axis, of the inner cylinder to an axial end of the outer cylinder, so that the insert portion has an annular recess extending in the axial direction of the central longitudinal axis. In that case the side surface with the injection-molded sections is arranged on a side of the insert portion facing away from the side with the recess. In particular, starting in the area of the transition from the inner cylinder via the ring disk to the outer cylinder, a U-shaped cross-section is formed.

The insert portion can be a sintered component, a cold-extruded component or a turned component. In particular, the insert portion is made of steel or aluminum.

According to a further development, the injection-molded sections each have a three-sided or triangular basic shape. In this case one corner of each injection-molded section is directed radially inward in the direction toward the central longitudinal axis. In particular the corner directed radially inward is formed as a first corner of the injection-molded section concerned, and to form the three-sided or triangular shape each injection-molded section has a second corner and a third corner. The corners can define a sharp angle, or the corners can be rounded. Preferably, each injection-molded section has two side edges while between the two side edges an obtuse angle opening radially outward relative to the central longitudinal axis is formed. In particular, the two side edges converge toward one another, as viewed radially inward, to form the corner or first corner. The two ends of the two side edges that are directed radially outward are connected to one another by an edge section of the injection-molded section concerned. Thus, the edge section and the first side edge converge to form a second corner, and the edge section and the second edge section converge to form a third corner. In particular, sections of the plurality of injection-molded sections are distributed and/or formed uniformly around the central longitudinal axis.

According to a further embodiment, the insert portion has a central through-hole and/or axle. In particular, the axle passes through the through-hole and/or is fixed therein. The injection-molded section, in particular a corner of the injection-molded section concerned, is spaced a distance away from the through-hole and/or axle. Preferably an annular side-surface area of the side surface of the insert portion is left free between the injection-molded sections and/or the axle. Thus, the annular side-surface area of the insert portion located radially inward relative to the central longitudinal axis is not covered by the plastic that forms the outer portion.

Preferably, the radially inward directed corner of the injection-molded section concerned has a curved or circular-section shape. The corner can have a radius such that a notional full circle with this radius coincides completely with the side surface of the insert portion. Preferably, the notional full circle coincides with an outer circumference of the insert portion. The full circle can correspond to a surface of impingement for injection-molding the injection-molded section concerned. A mid-point of the full circle can correspond to the position or orientation of an injection-molding point, in particular an outlet of a hot runner manifold for injection-molding the injection-molded section concerned. Preferably, the positioning or location of the injection-molding point and/or the hot runner manifold on the side surface of the insert portion is a function of the diameter of the gearwheel and a diameter of the hot runner manifold, in particular a nozzle of the hot runner manifold.

In a further embodiment, the toothed rim has an annular rim section. Preferably, the toothed rim is formed by the annular rim section and the teeth that extend radially from the rim section outward relative to the central longitudinal axis. In this case an inner circumference of the rim section is arranged to coincide with an outer circumference of the insert portion, in particular fixed with an interlock between the inner circumference of the rim section and the outer circumference of the insert portion. The interlock can be formed, for example, by knurling the outer circumference of the insert portion. An outer circumference of the rim section can correspond to a root circle diameter of the teeth of the toothed rim.

In particular, an edge section of the injection-molded section concerned, which is directed radially outward relative to the central longitudinal axis, is arranged at least partially or totally between the inner circumference of the rim section and the root circle diameter. Thus, the injection-molded section projects radially relative to the central longitudinal axis, beyond the outer circumference of the insert portion. In particular, the edge section projects radially outward relative to the central longitudinal axis beyond the root circle diameter in the area of the teeth, preferably in the area of the tooth roots of the teeth.

According to a further development, the edge section of each injection-molded section is the shape of a section of a circle. The rim sections of all the injection-molded sections are arranged specifically on a notional common circle concentric with the central longitudinal axis. The thickness of each injection-molded section can decrease, at least in part, in the direction of the edge section and/or in the area of the rim section. For example, the thickness of the injection-molded section decreases continuously, at least in part.

In a further embodiment, the rim section of each injection-molded section has a flow contour with at least one chamfer and/or with at least one rounded edge. In particular, by virtue of the flow contour the flow of the plastic during the injection-molding process for forming the outer portion is improved. Preferably, the flow contour has a first rounded edge with a first radius, the first radius being curved outward convexly. In particular, the flow contour has a second rounded edge with a second radius, the second radius being curved inward concavely. The second rounded edge is located between the rim section and the first rounded edge. The first radius merges into the second radius. The first radius and/or the second radius can be in the form of a quarter-circle.

According to a further development, the outer portion comprises three injection-molded sections or four injection-molded sections. If there are three injection-molded sections, then these are arranged at an angle of 120° relative to one another and distributed around the central longitudinal axis. If there are four injection-molded sections, then these are arranged at an angle of 90° relative to one another and distributed around the central longitudinal axis. Thus, the injection-molded sections are distributed uniformly in the circumferential direction around the central longitudinal axis.

It is particularly advantageous for a steering mechanism for a vehicle, in particular a motor vehicle, to comprise a gearwheel according to the invention. The steering mechanism can be in the form of a steer-by-wire steering mechanism. The teeth of the toothed rim form a helical gear array and co-operate with at least one worm gear or at least one worm shaft. The gearwheel can ensure reliable force and torque transmission. At the same time a lighter and less expensive structure can be produced.

In addition, there is an advantageous method for producing a gearwheel according to the invention. In this, the insert portion is placed into an injection-molding die and the outer portion is injection-molded by way of a hot runner manifold.

Other than with a cold runner manifold, with a hot runner manifold the after-pressure feeding during injection-molding can be improved. Corresponding to the number of injection-molded sections of the outer portion to be injection-molded, the hot runner manifold has a plurality of outlets for the plastic for forming the outer portion. In particular, the hot runner manifold has a plurality of nozzles, such that each nozzle has or forms an outlet point. The outlets are directed toward the side surface of the insert portion in order to form the injection-molded sections and the toothed rim of the outer portion. In particular, the outlets are directed toward or are opposite to an injection-molding point. The injection-molding point can correspond to a mid-point of a notional full circle on the side surface, such that after the production of the respective injection-molded sections the notional full circle is inside the injection-molded sections and/or is flush with an outer circumference of the insert portion and/or ends flush with the radially inward-pointing corners of the injection-molded sections.

In particular, the gearwheel produced by the method according to the invention is a gearwheel according to the invention as described earlier. Preferably, the method is developed further in accordance with the design features explained in connection with the gearwheel according to the invention described herein. Furthermore, the gearwheel described herein can be developed further in accordance with the design features explained in connection with the method.

BRIEF DESCRIPTION OF THE DRAWINGS

Below, the invention is explained in greater detail with reference to the figures. In the figures, the same indexes denote the same, similar or functionally equivalent components or elements. The figures show.

DETAILED DESCRIPTION

Figure 1:
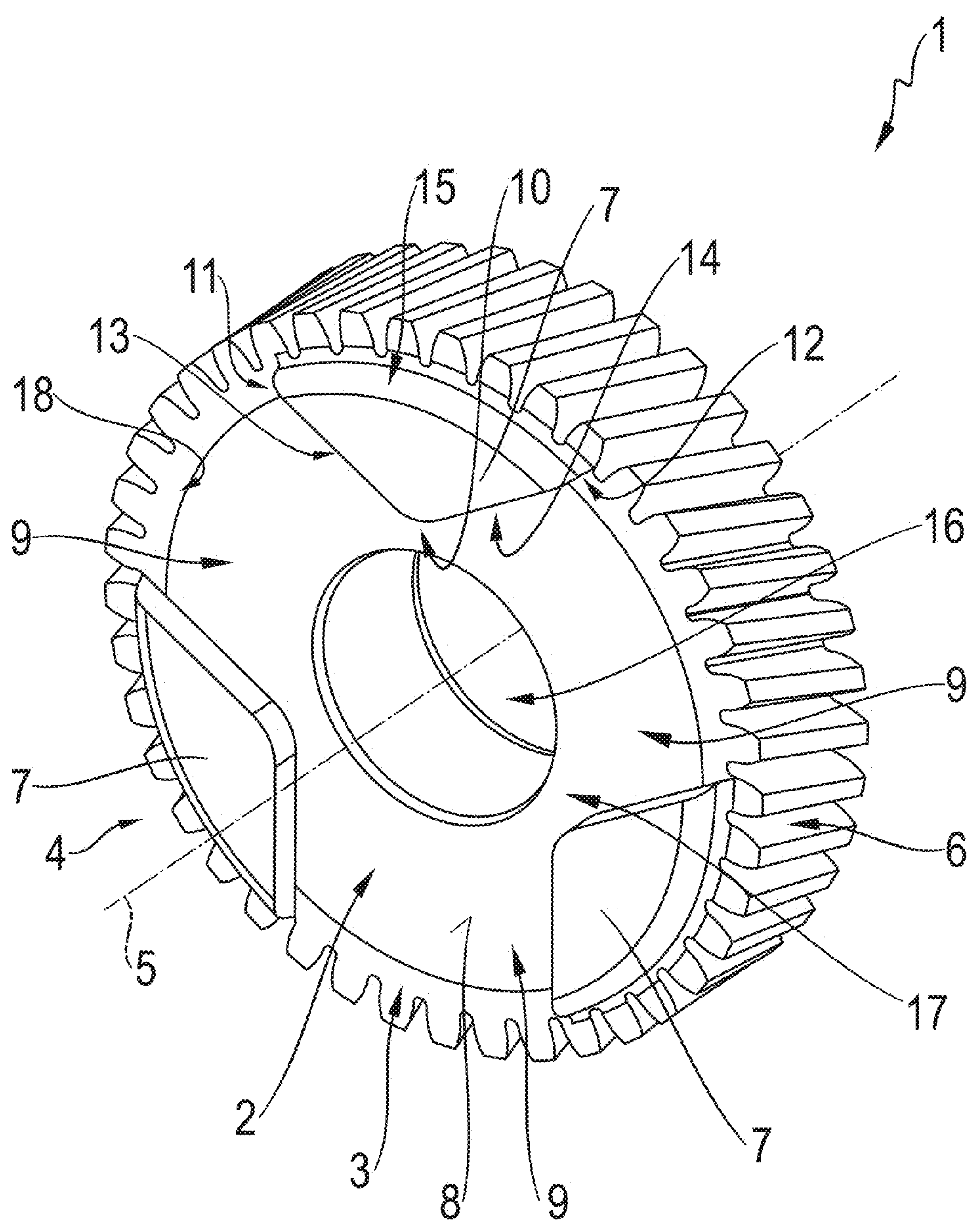
FIG. 1: A first perspective side view of a first gearwheel according to the invention.

FIG. 1 shows a first perspective side view of a first gearwheel 1 according to the invention. The gearwheel 1 is designed for a steering mechanism (not shown here), for example a steer-by-wire steering mechanism. In this example embodiment, the gearwheel 1 is made as a two-component gearwheel. Accordingly, the gearwheel 1 comprises an insert portion 2 and an outer portion 3.

The insert portion 2 is made of metal and the outer portion 3 is made of plastic. The outer portion comprises a toothed rim 4, wherein the toothed rim 4 comprises a plurality of teeth 6 directed radially outward relative to a central longitudinal axis 5 of the gearwheel 1. In this example embodiment, the teeth 6 of the outer portion 3 form a helical tooth array. For the sake of greater clarity not all the teeth 6 are indexed.

The outer portion 3 is injection-molded around the outer circumference of the insert portion 2. In addition, the outer portion 3 comprises a plurality of injection-molded sections 7. In this example embodiment the outer portion 3 has a total of three injection-molded sections. The injection-molded sections 7 are formed integrally or in one piece with the toothed rim 4. The insert portion 2 has a side surface 8 that extends at a right-angle to the central longitudinal axis 5. All the injection-molded sections 7 are arranged on the side surface 8 or in contact with the side surface 8. In this case the injection-molded sections 7 are distributed uniformly around the central longitudinal axis, namely here at an angle of 120° apart from one another. By means of the injection-molded sections 7 the insert portion 2 is fixed at least in an axial direction relative to the central longitudinal axis 5.

The injection-molded sections 7 are a distance apart from one another on the side surface 8. In this example embodiment the injection-molded sections 7 do not merge directly with one another. Instead, side surface areas 9 of the side surface 8 between injection-molded sections 7 immediately adjacent to one another in the circumferential direction relative to the central longitudinal axis 5 are left completely free. Since in this case there are three injection-molded sections 7, in this example embodiment, there are three corresponding free side surface areas 9.

The injection-molded sections 7 each have a three-sided and/or triangular basic shape. Correspondingly, the injection-molded sections 7 have a first corner 10, a second corner 11, and a third corner 12. The first corner 10 of each injection-molded section 7 is directed radially inward in the direction toward the central longitudinal axis 5. In this example embodiment, the first corner 10 is rounded. On the other hand, in this example embodiment, the second corner 11 and the third corner 12 are each define an acute angle.

The injection-molded sections 7 have in each case two side edges 13 and 14. Between the two side edges 13, 14, starting from the first corner 10, an obtuse angle is formed which opens radially outward relative to the central longitudinal axis 5. In other words, as viewed radially inward, the two side edges 13 and 14 converge toward the first corner 10.

The two radially outward-directed ends of the two side edges 13, 14, or the two corners 11 and 12, are connected to one another by means of an edge section 15 of the injection-molded section 7 concerned. Thus, the edge section 15 and the first side edge 13 converge to form the second corner 11 and the edge section 15 and the second side edge 14 converge to form the third corner 12.

In this example embodiment, the edge section 15 of each injection-molded section 7 is in the shape of a circular segment. In contrast, in this example embodiment the side edges 13 and 14 are each straight. The circular segment shaped edge sections 15 of each injection-molded section 7 are located on a circle (not shown here and thus notional) and are concentric with the central longitudinal axis 5.

In this example embodiment, the insert portion 2 is in the form of a hub with an annular disk shape. Correspondingly, the insert portion 2 has a central through-going opening 16. For example, the gearwheel 1 can be pushed or pressed onto an axle (not shown here) in such manner that the axle passes through, or partially through the through-going opening 16.

In this example embodiment, the injection-molded sections 7, or the first corner 10 of each injection-molded section 7, is a distance away from the through-going opening 16. Consequently, an annular side surface area 17 of the side surface 8 of the insert portion 2 between the injection-molded sections 7 and the through-going opening 16 is left free. Thus, the annular side surface area 17 radially inside relative to the central longitudinal axis 5, and likewise the side surface areas 9 of the insert portion 2, are not covered by the plastic forming the outer portion 3.

The toothed rim 4 of the outer portion 3 has an annular rim section 18. Thus, the toothed rim 4 is formed by the rim section 18, and the teeth 6 that extend from the rim section 18 extend radially outward relative to the central longitudinal axis 5. An inside circumference of the rim section 18 coincides with an outer circumference of the insert portion 2. Between the inside circumference of the rim section 18 and the outer circumference of the insert portion 2 an interlock (not shown in greater detail here) is formed for fixing the inside circumference of the rim section 18 onto the outer circumference of the insert portion 2. At the same time an outer circumference of the rim section 18 forms a root circle diameter of the teeth 6 of the toothed rim 4.

According to this example embodiment, the outward-directed edge section 15 of the injection-molded section 7 concerned is arranged at least partially between the inside circumference of the rim section 18 and the root circle diameter of the teeth 6 of the toothed rim 4. Thus, the injection-molded section concerned projects radially relative to the central longitudinal axis 5 beyond the outer circumference of the insert portion 2. In this example the edge section 15 projects radially outward relative to the central longitudinal axis 5 beyond the root circle diameter in the area of the teeth 6 or in the area of the tooth roots of the teeth 6.

Figure 2:
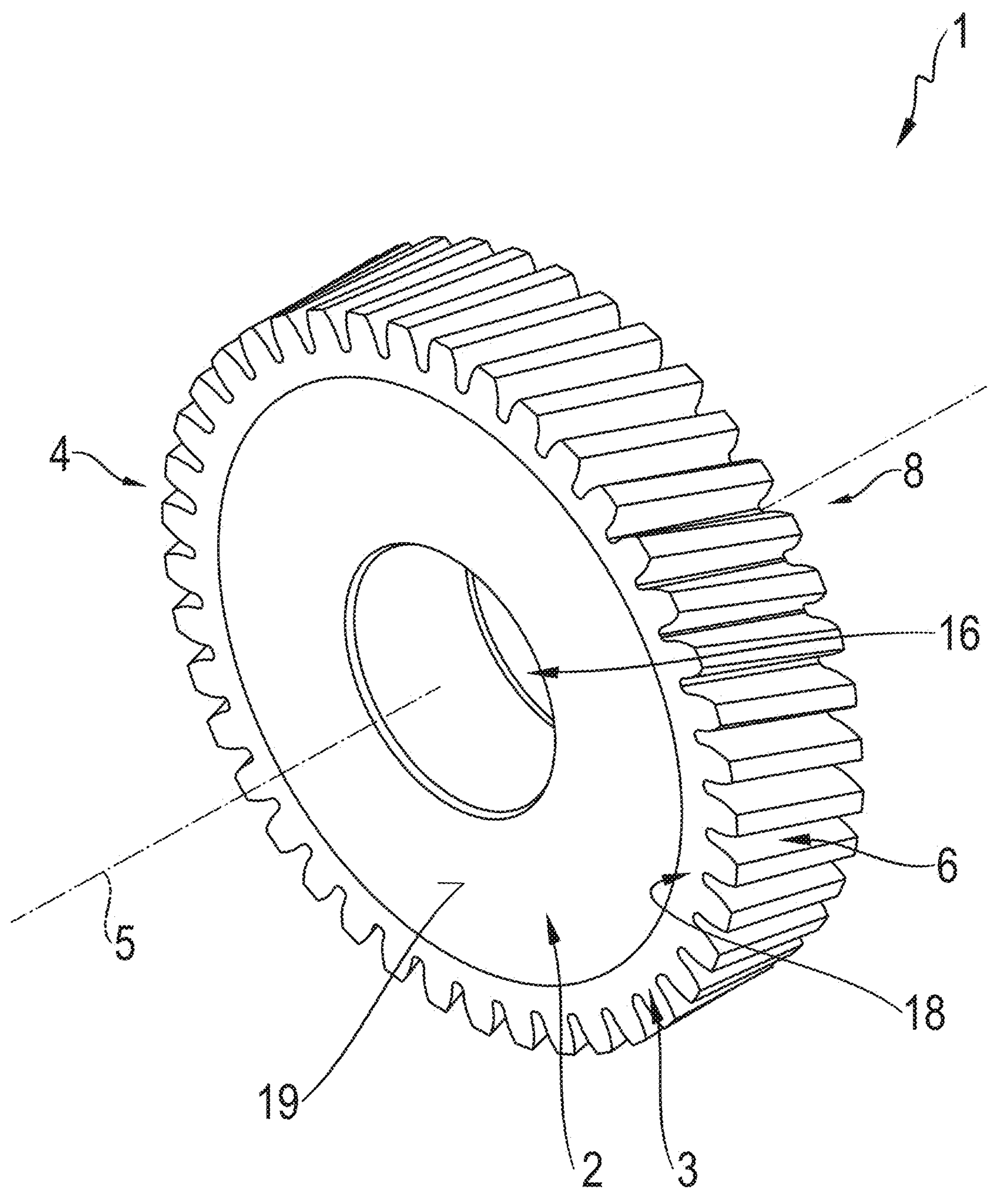
FIG. 2: A second perspective side view of the first gearwheel according to the invention shown in FIG. 1, FIG. 3: A sectioned side view of the first gearwheel according to the invention shown in FIGS. 1 and 2, FIG. 4: A further perspective side view of the first gearwheel according to the invention shown in FIGS. 1 to 3, with a schematically indicated hot runner manifold.

FIG. 2 shows a second perspective side view of the first gearwheel according to the invention as shown in FIG. 1. The figure shows a side surface 19 of the insert portion 2 other than the side surface 8 that has the injection-molded sections 7 (which are not visible here). In this example embodiment, the further side surface 19 is not covered by the plastic of the outer portion 3. Thus, the plastic of the outer portion 3 is arranged exclusively on the side surface 8 shown in FIG. 1 to form the injection-molded sections 7 and around the outer circumference of the insert portion 2 to form the toothed rim 4. Alternatively, a design is possible in which the plastic of the outer portion 3 surrounds or embraces the outer circumference of the insert portion 2 so that the plastic of the outer portion 3 is also arranged on the further side surface 19. In that way the interlock between the outer portion 3 and the insert portion 2 can be improved.

Figure 3:
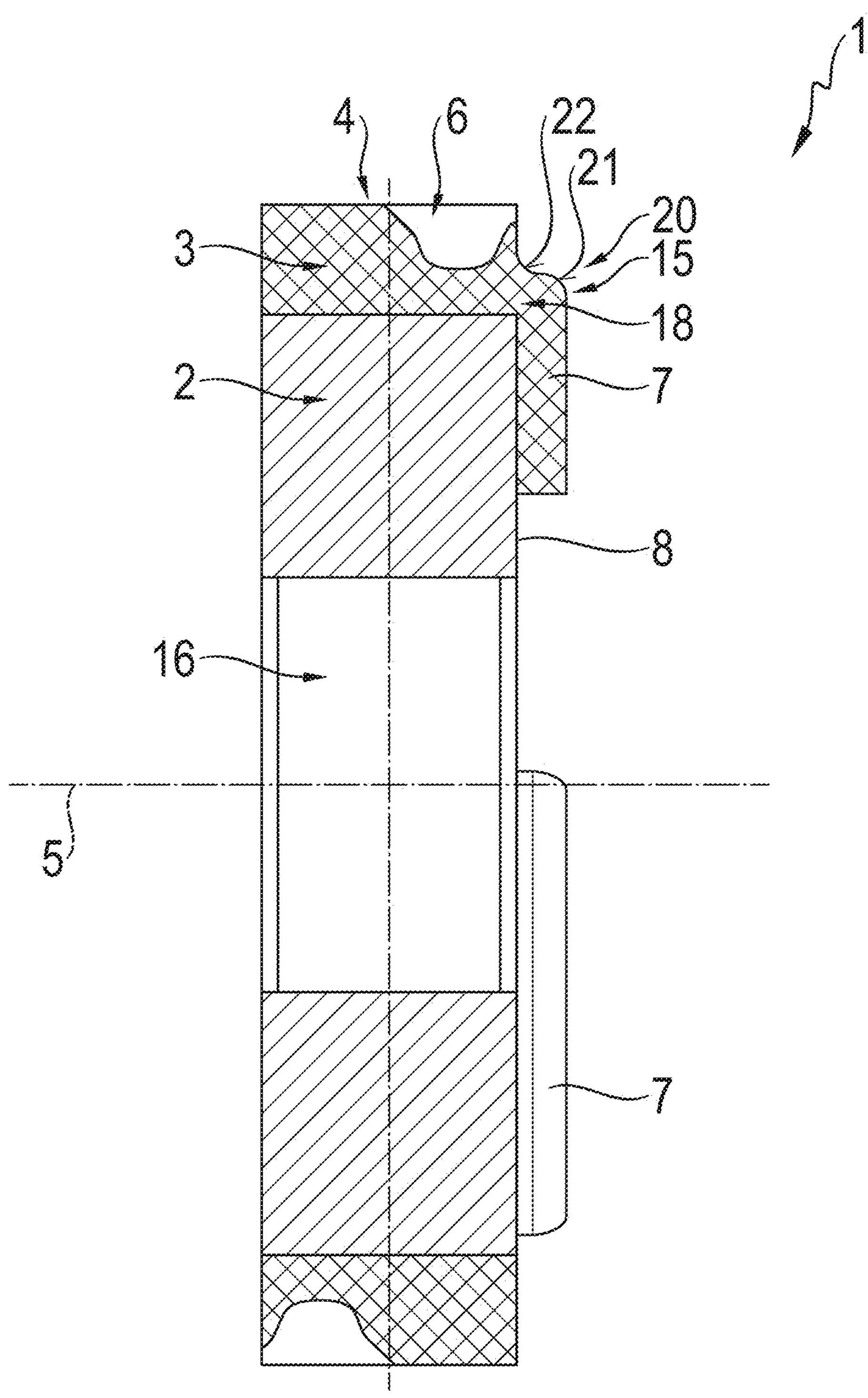

FIG. 3 shows a sectioned side view of the first gearwheel 1 according to FIGS. 1 and 2. The transition of an injection-molded section 7 into the toothed rim 4 can be seen clearly. In this example embodiment, the edge section 15 of the injection-molded section 7 concerned has a flow contour 20. By virtue of the flow contour 20 the flow of the plastic is improved during injection-molding to form the outer portion 3.

In this example embodiment, the flow contour 20 has a first rounded edge 21 with a first radius, this first radius being curved convexly outward. In addition, in this example the flow contour 20 has a second rounded edge 22 with a second radius, this second radius being curved concavely inward. Thus, the second rounded edge 22 is between the rim section 18 and the first rounded edge 21. The first radius of the first rounded edge 21 merges into the second radius of the second rounded edge 22, and in this example the first rounded edge 21 and the second rounded edge 22 each extend over a quarter of a circle.

In this example embodiment, the thickness of each injection-molded section 7 is constant. Alternatively, the thickness of each injection-molded section 7 can decrease, at least in part, in the direction toward the edge section 15 and/or in the area of the edge section 15.

Figure 4:
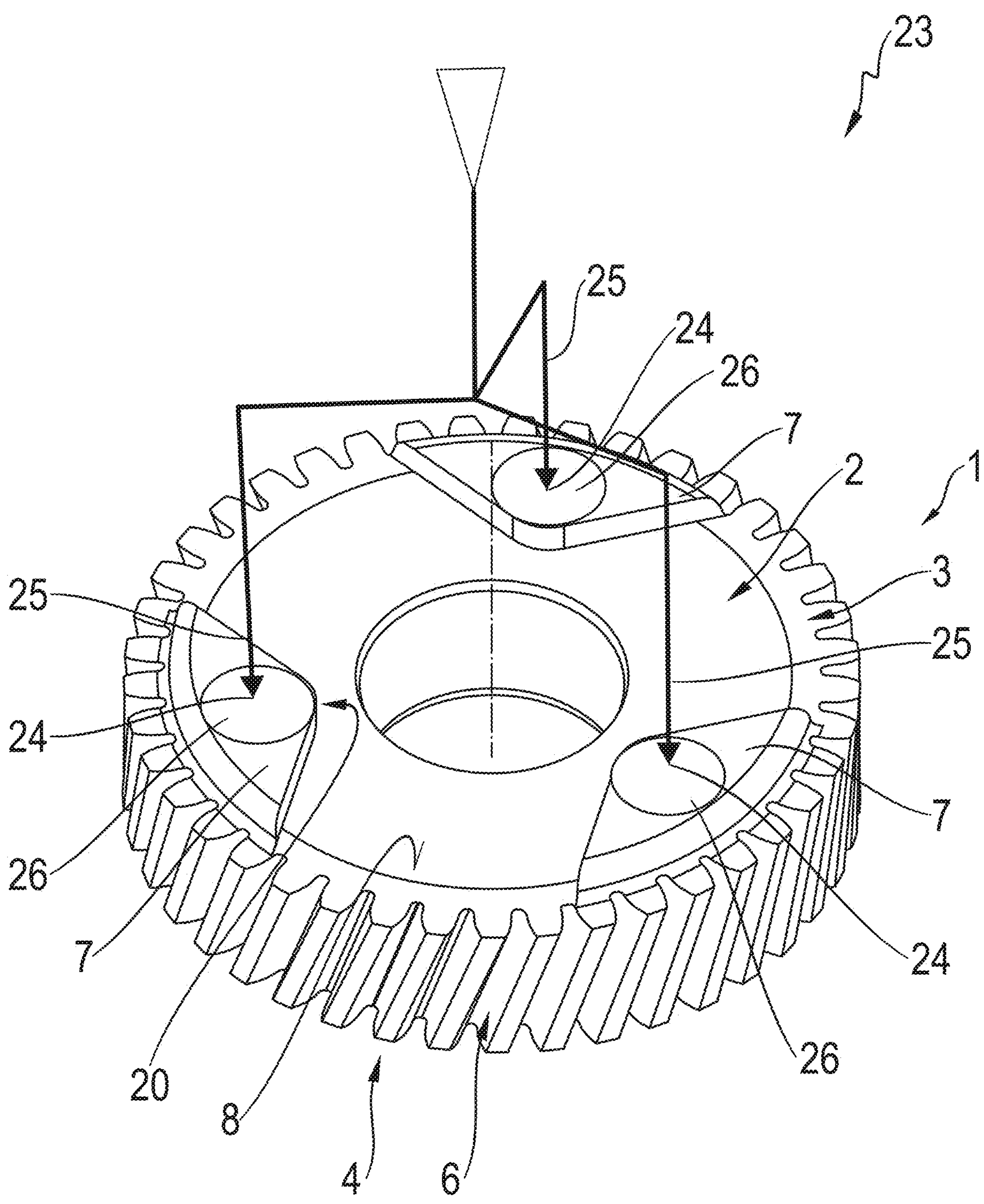

FIG. 4 shows a further perspective side view of the gearwheel 1 according to the invention according to FIGS. 1 to 3, with a schematically indicated hot runner manifold 23.

To produce the gearwheel 1, the insert portion 2 is placed in an injection-molding die (not shown here). The outer portion 3 is then injection-molded by way of the hot runner manifold 23. For that purpose, the hot runner manifold has a plurality of outlet points 24 for the plastic, the number thereof corresponding to the number of injection-molded sections 7 of the outer portion 3 to be formed, in order to produce the outer portion 3.

In this example embodiment, the hot runner manifold 23 has a total of three nozzles 25 (only schematically illustrated), each nozzle constituting an outlet point 24. The outlet points 24 or nozzles are directed toward the side surface 8 of the insert portion 2 in order to form the injection-molded sections 7 and the toothed rim 4 of the outer portion 3. For that purpose, the outlet points 24 or nozzles 25 are each arranged opposite an injection-molding point.

According to this example, such an injection-molding point corresponds to a mid-point of a notional full circle 26 on the side surface 8 or in this case indicated on a top side of the injection-molded section 7. After the production of the injection-molded section 7 concerned, this full circle 26 is located within the injection-molded section 7. In this example embodiment the full circle 26 is bounded flush by an outer circumference of the insert portion 2 and flush by the radially inward-directed first corner 20 of the injection-molded section 7 concerned. The radially inward-directed first corner 20 of the injection-molded section 7 concerned is correspondingly rounded in the shape of a section of a circle. Thus, in this example embodiment the first corner 20 has a radius that is the same as the radius of the full circle 20. The full circle 20 corresponds to an impingement area on the side surface 8 of the insert portion 2 for injection-molding the injection-molded section 7 and forming the outer portion 3.

Figure 5:
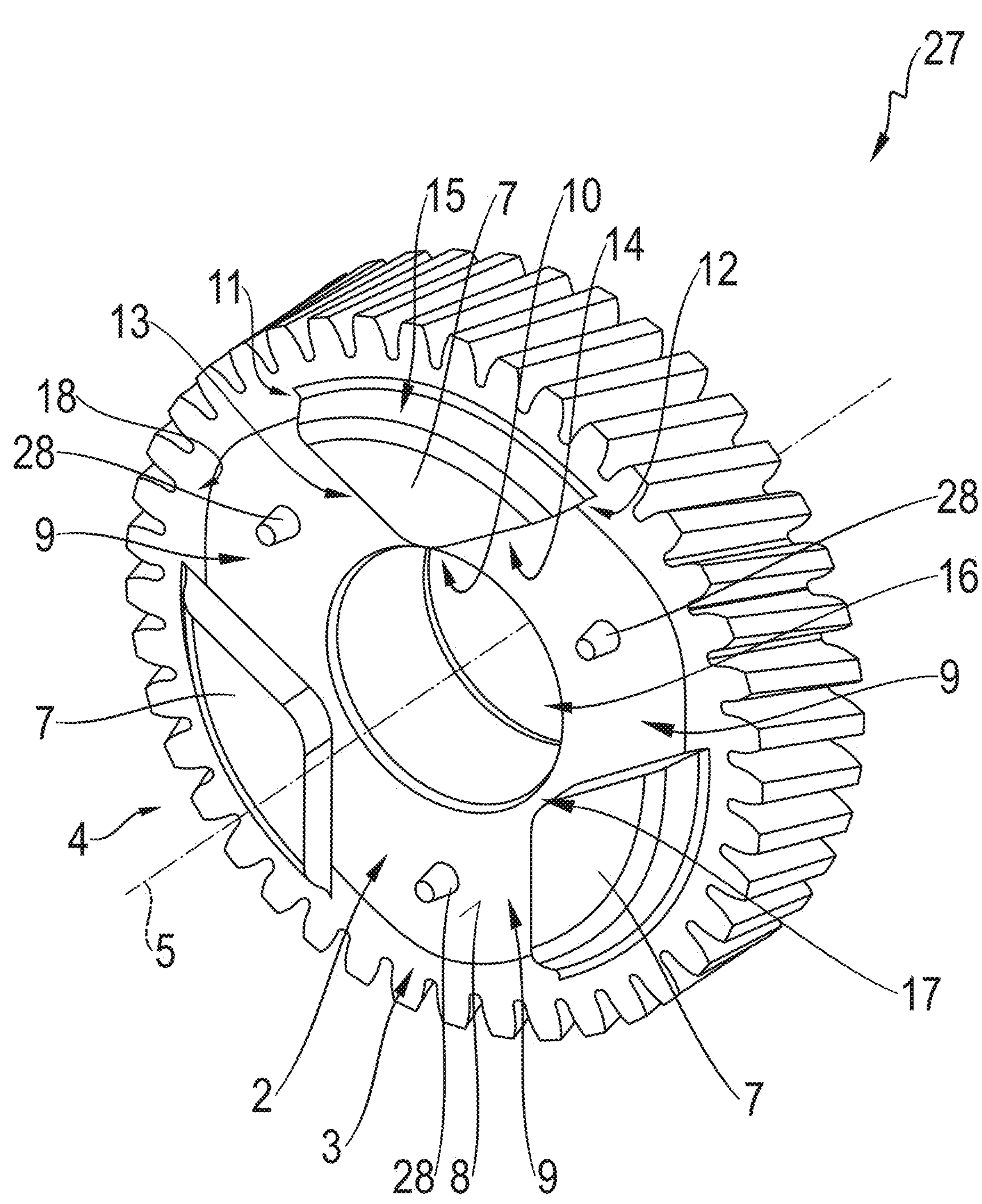
FIG. 5: A first perspective side view of a second gearwheel according to the invention.

FIG. 5 shows a first perspective side view of a gearwheel 27 according to the invention. The structure and functional mode of the second gearwheel 27 corresponds largely to those of the first gearwheel 1 shown in FIGS. 1 to 4. The same features are denoted by the same indexes as before. Consequently, to avoid repetition reference should be made to the earlier description.

Other than in the gearwheel 1, the gearwheel 27 shown in this case has an insert portion 2 with an out-of-round outer circumference. In correspondence thereto, the inner circumference of the outer portion 3, or toothed rim 4 with the rim section 18, is also out-of-round. This improves the interlock between the insert portion 2 and the outer portion 3.

In this example embodiment, a number of projections 28 are arranged or formed on the side surface 8. Each projection 28 is arranged in the area of the side surface section 9 and mid-way between two adjacent injection-molded sections 7. The projections 28 extend parallel to the central longitudinal axis 5. In this example, the projections 28 have a height that corresponds to the thickness, or to a maximum thickness of the injection-molded sections 7. Furthermore, in this case the projections 28 have the shape of a truncated cone.

By virtue of the projections 28, to produce the gearwheel 27 the insert portion 2 can be placed in an injection-molding die (not shown here) in a predetermined and correctly orientated position. For that purpose, the injection-molding die has recesses corresponding to the projections 28, into which the projections fit with interlock. Positioning of such an insert portion 2 in the injection-molding die in this way is particularly advantageous when the insert portion 2 is out-of-round, as in this case, in order to ensure reproducible orientation of the insert portion 2 relative to the injection-molded outer portion 3, in particular with improved after-pressure feeding during the injection-molding of the outer portion 3.

Figure 6:
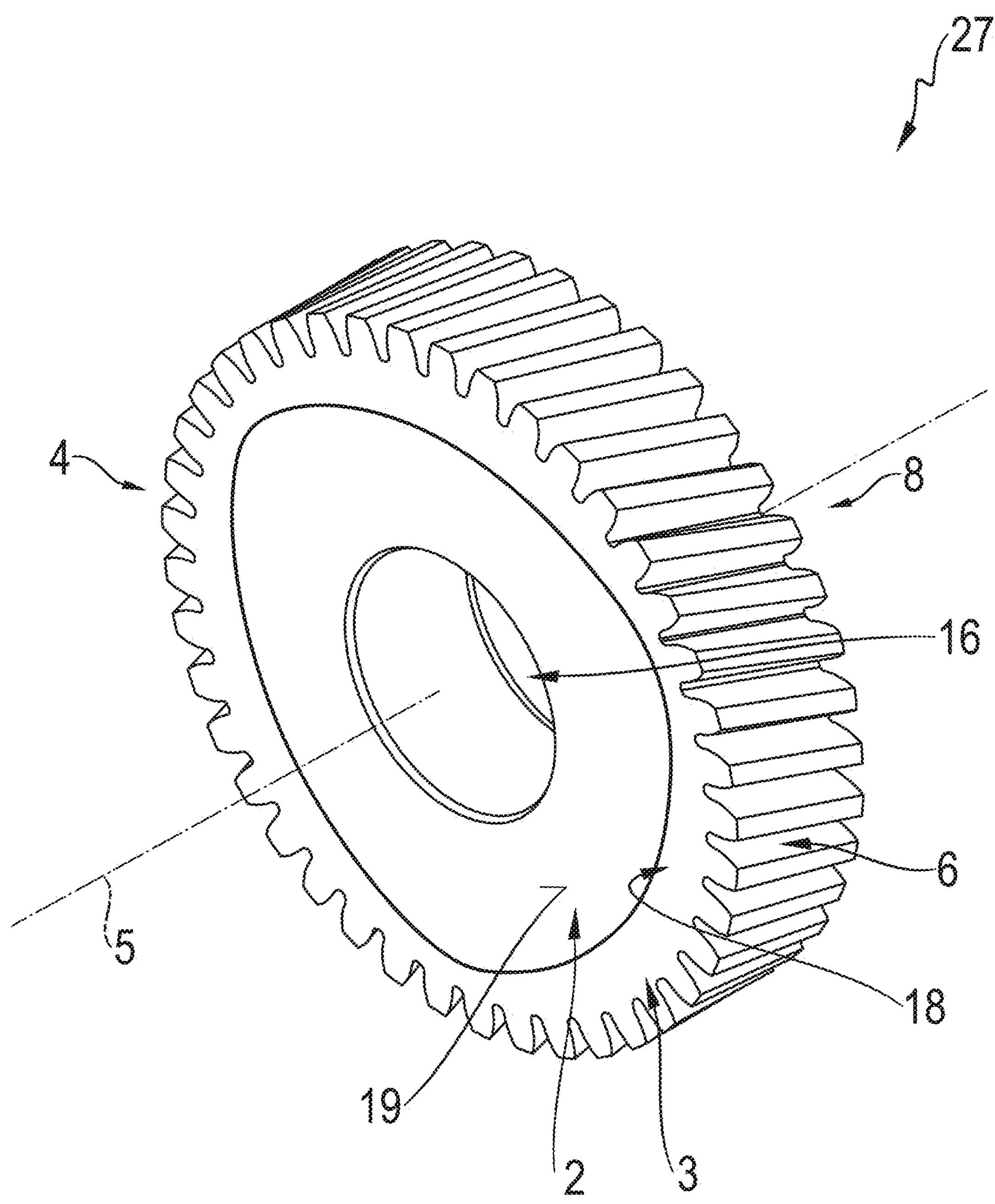
FIG. 6: A second perspective side view of the second gearwheel according to the invention shown in FIG. 5, FIG. 7: A perspective side view of a third gearwheel according to the invention.

FIG. 6 shows a second perspective side view of the second gearwheel 27 according to the invention shown in FIG. 5. In this case the out-of-round contour of the outer circumference of the insert portion 2 and of the inner circumference of the toothed rim 4 and the rim section 18 corresponding to it can be seen clearly.

In this example embodiment as well, the further surface 19 is not covered by the plastic of the outer portion 3.

Figure 7:
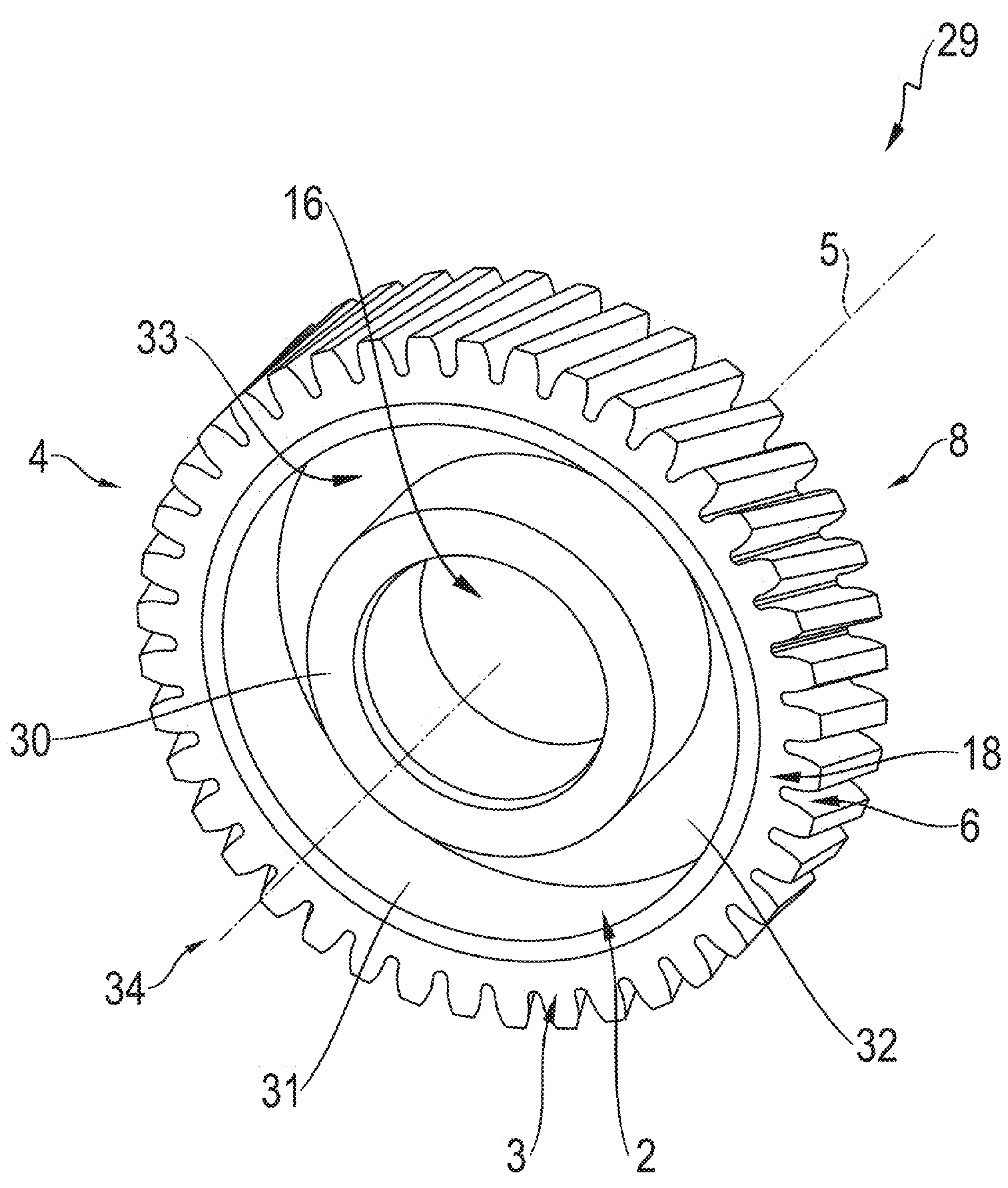

FIG. 7 shows a perspective side view of a third gearwheel 29 according to the invention. The structure and functional mode of this further gearwheel 29 correspond largely to those of the first gearwheel 1 shown in FIGS. 1 to 4 and the second gearwheel 27 shown in FIGS. 5 and 6. The same features are denoted by the same indexes as before, so to avoid repetitions, reference should again be made to the earlier description.

Other than in the gearwheels 1 and 27, the gearwheel 29 shown here has an insert portion 2 wherein the insert portion 2 in this example embodiment comprises an inner cylinder 30, an outer cylinder 31 and an annular disk 32. In this case the insert portion 2 is made integrally or in one piece. Furthermore, the inner cylinder 30 is connected to the outer cylinder 31 by means of the annular disk 32. Thus, the annular disk 32 is arranged between the inner cylinder 30 and the outer cylinder 31.

In detail, in this example embodiment, the annular disk 32 connects an end of the inner cylinder 30, axial relative to the central longitudinal axis 5, to an axial end of the outer cylinder 31. The annular disk 32 extends perpendicularly to the central longitudinal axis 5. Accordingly, the insert portion 2 in this example embodiment has an annular recess 33 extending in the direction of the central longitudinal axis 5. In this case the side surface 8, not visible here, is arranged on a side of the insert portion 2 facing away from a side 34 with the recess 33.

Figure 8:
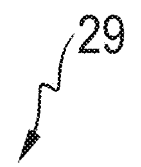
FIG. 8: A sectioned side view of the third gearwheel according to the invention shown in FIG. 7, and FIG. 9: A sectioned side view of a further gearwheel according to the invention.
Figure 8:
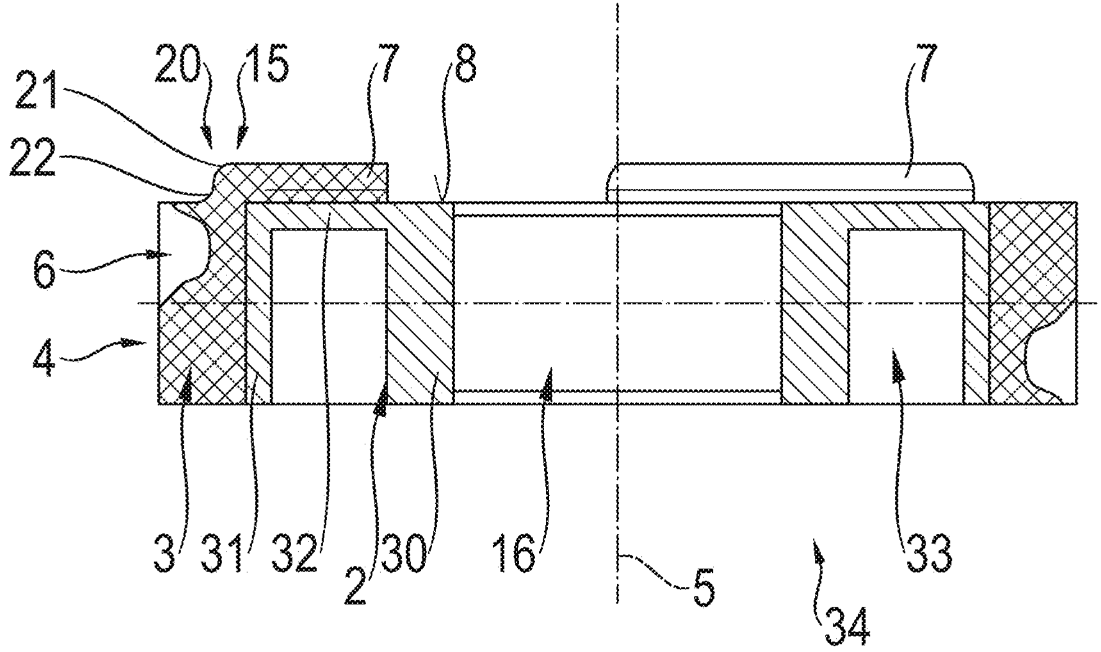

FIG. 8 shows a sectioned side view of the third gearwheel 29 according to the invention shown in FIG. 7. It can be seen clearly that in the area of the transition from the inner cylinder 30 via the annular disk 32 to the outer cylinder 31 a U-shaped cross-section is formed.

Figure 9:
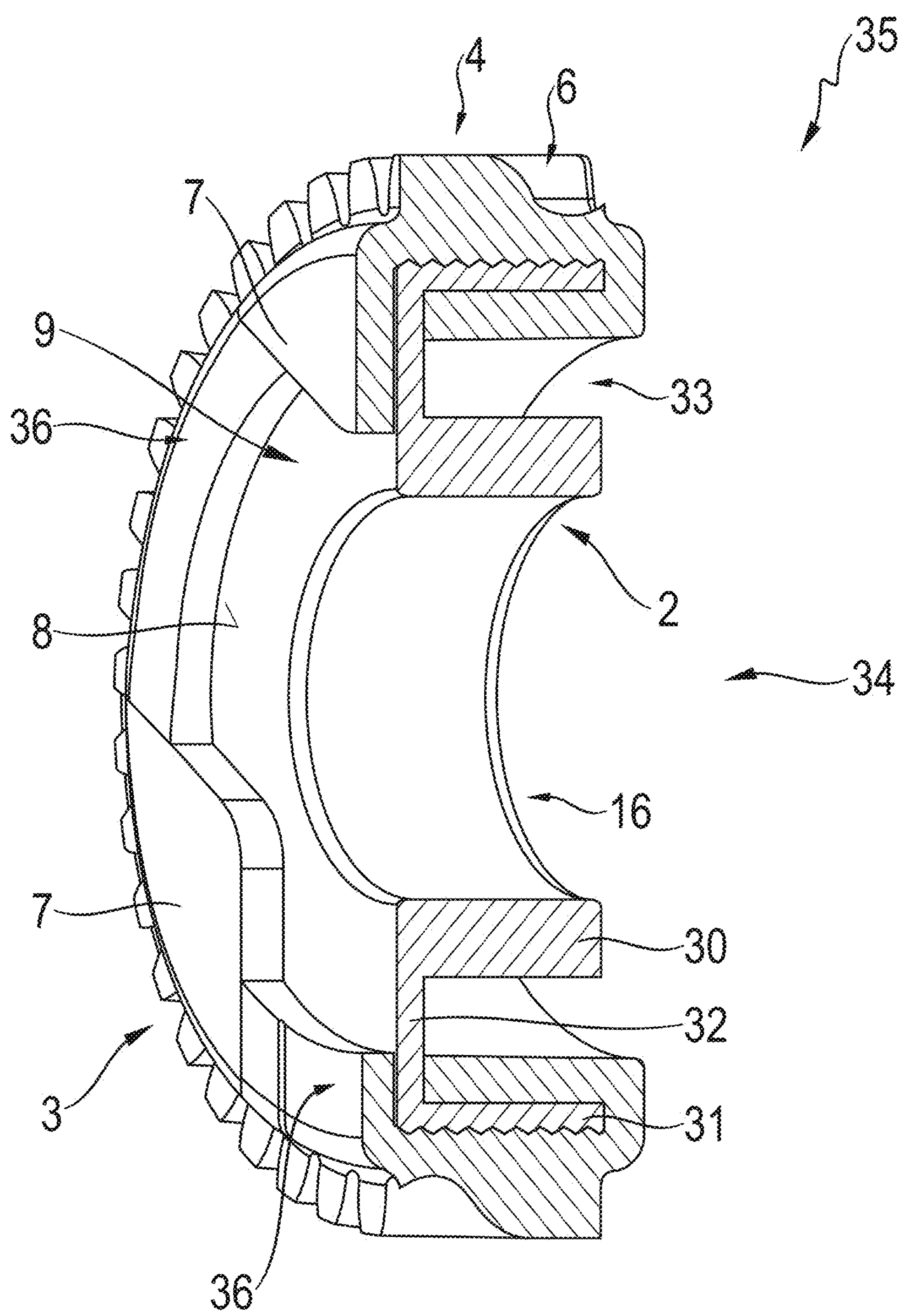

FIG. 9 shows a sectioned side view of a further gearwheel 35 according to the invention. The structure and functional mode of this further gearwheel 35 correspond largely to those of the third gearwheel 29 according to FIGS. 7 and 8, so in order to avoid repetitions reference should again be made to the earlier description.

Other than in the third gearwheel 29, the further gearwheel 35 shown here has a web-like or strip-like connecting section 36 between directly adjacent injection-molded sections 7. In this example embodiment the connecting sections 36 are curved or shaped as ring segments. The connecting sections 36 are made from the plastic of the outer portion 3 and form part of the outer portion 3. Thus, the directly adjacent injection-molded sections 7 merge partially into one another on the side surface 8 by virtue of the respective connecting sections 36 between them. Furthermore, the connecting sections 36 merge into the toothed rim 4 of the outer portion 3. The connecting sections 36 are integral or one-piece constituents of the outer portion 3. At the same time however, in this further gearwheel 35 a side surface area 9 between the directly adjacent injection-molded sections 7 is also left free.

In the example embodiment according to the gearwheel 35 pictured here, the plastic of the outer portion 3 surrounds the outer circumference of the insert portion 2. Since the outer circumference of the insert portion 2 is surrounded, in this example the plastic of the outer portion 3 is also in contact with the inner circumferential side of the outer cylinder 31. Furthermore, in this example embodiment the plastic of the outer portion 3 extends into the recess 33 until it comes into contact with the annular disk 32. In this embodiment the interlock between the outer portion 3 and the insert portion 2 is improved.

INDEXES

1 Gearwheel
2 Insert portion
3 Outer portion
4 Toothed rim
5 Central longitudinal axis
6 Tooth
7 Injection-molded section
8 Side surface
9 Side surface area
10 First corner
11 Second corner
12 Third corner
13 Side edge
14 Side edge
15 Edge section
16 Through-going opening
17 Annular side-surface area
18 Rim section
19 Further side surface
20 Flow contour
21 First rounded edge
22 Second rounded edge
23 Hot runner manifold
24 Outlet point
25 Nozzle
26 Full circle
27 Gearwheel
28 Projection
29 Gearwheel
30 Inner cylinder
31 Outer cylinder
32 Annular disk
33 Recess
34 Side
35 Gearwheel
36 Connecting section

The invention claimed is:

1. A gearwheel comprising:

an insert portion made of mtetal; and an outer portion made of plastic, wherein the outer portion comprises a toothed rim with a plurality of teeth directed outward relative to a central longitudinal axis of the gearwheel and the outer portion is injection-molded onto the insert portion, wherein the outer portion has a plurality of injection-molded sections on a side surface of the insert portion which is directed transversely to the central longitudinal axis, wherein each of the injection-molded sections has a triangular shape, wherein one corner of each injection-molded section extends radially inward toward the central longitudinal axis, and wherein the plurality of injection-molded sections on the side surface of the insert portion are positioned a distance apart from one another and side surface areas of the insert portion between directly adjacent injection-molded sections are left free.

2. The gearwheel according to claim 1, wherein a side or further side surface of the insert portion is completely uncovered by the plastic of the outer portion, and the insert portion has a form selected from (i) a cylindrical hub or disk-shaped hub or a hub with an inner cylinder, (ii) an outer cylinder, and (iii) an annular disk connecting the inner cylinder to the outer cylinder.

3. The gearwheel according to claim 1, wherein each injection-molded section has two side edges arranged such that between the two side edges an obtuse angle opening radially outward relative to the central longitudinal axis is formed, and wherein the plurality of injection-molded sections are distributed uniformly around the central longitudinal axis.

4. The gearwheel according to claim 1, wherein the insert portion defines a central through-going opening, wherein a corner of each injection-molded section is-spaced from the through-going opening, and wherein an annular side surface area of the side surface between the injection-molded sections and the through-going opening is left free.

5. The gearwheel according to claim 1, wherein the corner extending radially inward of each injection-molded section is curved and defines a radius, such that a notional full circle with that radius lies completely on the side surface of the insert portion and coincides flush with an outer circumference of the insert portion.

6. The gearwheel according to claim 1, wherein the toothed rim has an annular rim section, wherein an inner circumference of the annular rim section is arranged on an outer circumference of the insert portion and an outer circumference of the annular rim section corresponds to a root circle diameter for the teeth of the toothed rim, and an edge sectionof each injection-molded section directed radially outward relative to the central longitudinal axis is arranged at least partially or completely between the inner circumference of the rim section and the root circle diameter, and the edge section projects radially, relative to the central longitudinal axis, outward into the root circle diameter in an area of the teeth.

7. The gearwheel according to claim 6, wherein the edge section of each injection-molded section has a shape of a section of a circle, wherein the edge sections of all the injection-molded sections lie on a common circle and are arranged concentrically with the central longitudinal axis, and wherein a thickness of each injection-molded section decreases at least in part in the direction toward the edge section.

8. The gearwheel according to claim 6, wherein the edge section of each injection-molded section has a flow contour with at least one chamfer and/or with at least one rounded edge, the flow contour having a first rounded edge with a first radius-being curved convexly outward, and a second rounded edge with a second radius-being curved concavely inward, and wherein the second rounded edge is formed between the rim section and the first rounded edge.

9. The gearwheel according to claim 1, wherein the outer portion has three injection-molded sections distributed around the central longitudinal axis with 120° spacing.

10. The gearwheel according to claim 1, wherein the outer portion has four injection-molded sections distributed around the central longitudinal axis with 90° spacing.

11. A steering mechanism for a vehicle, comprising the gearwheel according to claim 1, wherein the teeth of the toothed rim form a helical tooth array configured to cooperate with at least one worm gear or at least one worm shaft.

12. A method for producing the gearwheel according to claim 1, the method comprising:

placing the insert portion in an injection-molding die; and injection-molding the outer portion by way of a hot runner manifold, wherein the hot runner manifold has a plurality of outlet points arranged for forming the outer portion, the plurality of outlet points corresponding in number to a number of injection-molded sections to be formed, wherein the outlet points are directed toward the side surface of the insert portion.

13. The gearwheel according to claim 1, wherein the insert portion defines an axle wherein, a corner of each injection-molded section is-spaced from the axle, and an annular side surface area of the side surface between the injection-molded sections and the axis is left free.

14. The gearwheel according to claim 1, wherein the insert portion defines a central through-going opening and an axle wherein, a corner of each injection-molded section is-spaced from the through-going opening and the axle, and an annular side surface area of the side surface between the injection-molded sections and the through-going opening and axis is left free.

15. A gearwheel comprising:

an insert portion made of metal; and an outer portion made of plastic, wherein the outer portion comprises a toothed rim with a plurality of teeth directed outward relative to a central longitudinal axis of the gearwheel and the outer portion is injection-molded onto the insert portion, wherein the outer portion has a plurality of injection-molded sections on a side surface of the insert portion which is directed transversely to the central longitudinal axis, wherein each of the injection-molded sections has a three-sided shape, wherein one corner of each injection-molded section extends radially inward toward the central longitudinal axis, wherein each injection-molded section has two side edges arranged such that between the two side edges an obtuse angle opening radially outward relative to the central longitudinal axis is formed, wherein the plurality of injection-molded sections are distributed uniformly around the central longitudinal axis, wherein the corner extending radially inward of each injection-molded section is curved and defines a radius, such that a notional full circle with that radius lies completely on the side surface of the insert portion and coincides flush with an outer circumference of the insert portion, and wherein the plurality of injection-molded sections on the side surface of the insert portion are positioned a distance apart from one another and side surface areas of the insert portion between directly adjacent injection-molded sections are left free.

16. The gearwheel according to claim 15, wherein a side or further side surface of the insert portion is completely uncovered by the plastic of the outer portion, and the insert portion has a form selected from (i) a cylindrical hub or disk-shaped hub or a hub with an inner cylinder, (ii) an outer cylinder, and (iii) an annular disk connecting the inner cylinder to the outer cylinder.

17. The gearwheel according to claim 15, wherein the insert portion defines a central through-going opening, wherein a corner of each injection-molded section is spaced from the through-going opening, and an annular side surface area of the side surface between the injection-molded sections and the through-going opening is left free.

18. The gearwheel according to claim 15, wherein the outer portion has three injection-molded sections distributed around the central longitudinal axis with 120° spacing.

19. The gearwheel according to claim 15, wherein the outer portion has four injection-molded sections distributed around the central longitudinal axis with 90° spacing.

* * * * *